United States Patent Office 3,842,101
Patented Oct. 15, 1974

3,842,101
BLUE ANTHRAQUINOID ACID DYES
Fritz Graser, Ludwigshafen, Germany, assignor to Badische Anilin- & Soda-Fabrik Aktiengesellschaft, Ludwigshafen (Rhine), Germany
No Drawing. Filed May 16, 1973, Ser. No. 360,898
Claims priority, application Great Britain, May 19, 1972, 23,798/72
Int. Cl. C09b 1/34
U.S. Cl. 260—372
4 Claims

ABSTRACT OF THE DISCLOSURE

Anthraquinoid acid dyes of the formula

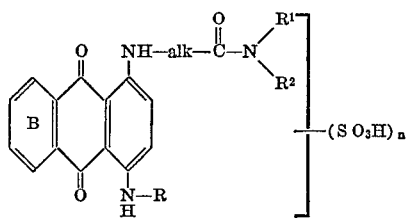

in which alk is a linear or branched alkylene of 1 to 3 carbon atoms, $R^1$ is an aromatic or a phenylaliphatic or an alkyl bearing phenoxy or phenylthio as a substituent, $R^2$ is hydrogen or lower alkyl, R is an aromatic substituted group, and $n$ is one of the integers 1 to 4, and in which 1 or 2 hydrogens in ring B may be replaced by hydroxy or chlorine. The dyes dye nitrogenous fibers, especially polyamide fibers, blue shades having good fastness to light and wet treatment.

---

The invention relates to blue anthraquinoid acid dyes of the 1,4-diaminoanthraquinone series.

The new acid dyes have the formula (I):

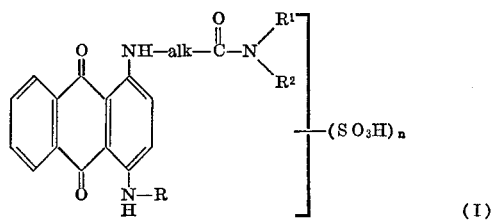

in which alk is a linear or branched alkylene of one to three carbon atoms;
$R^1$ is an aromatic or phenylaliphatic radical of seven to ten carbon atoms or an aliphatic radical of one to five carbon atoms which bears phenoxy or phenylthio as a substituent;
$R^2$ is hydrogen or lower alkyl;
R is a mononuclear or binuclear condensed or uncondensed aromatic radical which may bear from one to four identical or different substituents selected from the group consisting of alkyl, alkoxy, alkylthio of one to four carbon atoms or halogen and
$n$ is one of the integers 1 to 4; and in which one hydrogen or two hydrogens in the ring B may be replaced by hydroxy or chlorine.

The dyes dye nitrogenous fibers, particularly fibrous polyamide material, clear blue shades having very good fastness properties.

The preferred aromatic radical for $R^1$ is phenyl in which from one to four hydrogens, preferably from one to three hydrogens, may be replaced by alkyl, alkoxy or thioalkyl of one to four carbon atoms or halogen such as fluorine, chlorine or bromine, the said substituents being identical or different. Furthermore, one hydrogen may be replaced by nitro. $R^1$ may also be naphthyl or a radical of the formula:

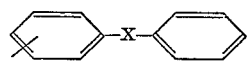

in which X is a direct linkage —O—, —S—, $$-SO_2-$$

—CH$_2$—, —CH$_2$—CH$_2$—, —CH(CH$_3$)— or
—C(CH$_3$)$_2$—.

Examples of phenylaliphatic radicals of seven to ten carbon atoms for $R^1$ are benzyl, β-phenylethyl, γ-phenylpropyl, β-methyl-β-phenylethyl or a radical of the formula

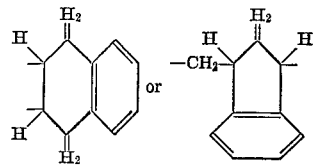

$R^1$ may also be an aliphatic radical of one to five carbon atoms in which one hydrogen is replaced by phenoxy or phenylthio and the phenyl radical may bear as a substituent alkyl, alkoxy of one to four carbon atoms and/or halogen such as chlorine, bromine or fluorine. Specific examples are β-phenoxyethyl and γ-phenoxypropyl.

The preferred substituent for $R^2$ is hydrogen. $R^2$ may also be a lower alkyl group. The term "lower alkyl" as used in the present application means alkyl of one to four carbon atoms, preferably methyl, ethyl or butyl.

The group

may be derived for example from the following amines: aniline, N-methylaniline, p-toluidine, mesidine, p-chloroaniline, 3,5-dichloroaniline, anisidine, phenetidine, α-naphthylamine, m-aminodiphenyl, p-aminodiphenyl, m-aminodiphenyl ether, p-aminodiphenyl ether, 1-amino-4′-chlorodiphenyl ether, β-phenylethylamine, β-phenyl-β-methylethylamine, γ - phenyl - γ - methylpropylamine, 2-aminomethylindane, 2-amino-1,2,3,4-tetrahydronaphthalenes, β-phenoxyethylamine, γ-phenoxypropylamine and 3-nitroaniline.

Suitable linear or branched alkylene bridges for alk are alkylene bridges of one to three carbon atoms. Specific alkylene bridges are as follows: methylene, 1,2-ethylene, 1,2-propylene and 1,3-propylene. The 1,2-ethylene group is particularly prferred.

Particularly suitable mononuclear or binuclear aromatic radicals (whose nuclei may be condensed) for R is the naphthyl radical, particularly the phenyl radical, or radicals of the formula:

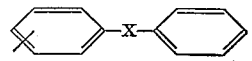

in which X is a direct bond or —O—, —S—, $$-SO_2-$$

—CH$_2$—, —CH$_2$—CH$_2$—, or

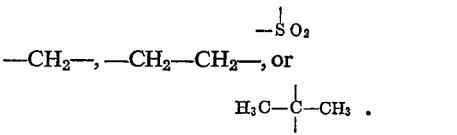

From one to four hydrogens, preferably from one to three hydrogens in the aromatic groups may be replaced by alkyl, alkoxy, alkylthio of one to four carbon atoms or halogen such as chlorine, bromine or fluorine, the substituents being identical or different.

The divalent radical R may be derived for example from benzene, toluene, xylene, trimethylbenzene, naphthalene, chlorobenzene, anisol, phenetol, diphenyl, diphenyl ether, diphenyl thioether, diphenylmethane or diphenylethane.

The preferred radical R is phenylene in which from one to three hydrogens may be replaced by methoxy, methyl, methylthio, fluorine, chlorine or bromine, the substituents being identical or different, or the diphenyl ether radical which may bear chlorine or bromine as substituent.

One or two hydrogens in the ring B of the anthraquinone system may be replaced by hydroxy or halogen. Those dyes are preferred however in which the ring B is not substituted.

The number (n) of sulfonic acid groups may be one to four and depends on the method of synthesis, the sulfonation conditions and the substituents $R^1$ and R. Four sulfonic acid groups can be introduced when four sulfonatable phenyl nuclei are present. By appropriate choice of the sulfonation conditions it is also possible to control the sulfonation so that a sulfonic acid group is not introduced into every phenyl nucleus. Thus, for example when $R^1$ and R contain only one phenyl nucleus each, one or two sulfonic acid groups may be introduced so that dye mixtures are obtained which contain on an average 1.2 to 2, preferably 1.5 to 2, sulfonic acid groups per molecule of dye (I).

When $R^1$ or R is a radical which is difficult to sulfonate, for example 3,5-dichlorophenyl, 4-chlorophenyl or nitrophenyl, these radicals may remain unsulfonated.

Furthermore dyes (I) in which only R bears one or more sulfonic acid groups (although $R^1$ is easily sulfonatable) may be obtained by suitable choice of the starting compounds.

The dyes of formula (I) are advantageously obtained by sulfonation of a 1,4-diaminoanthraquinone derivative of the formula (II):

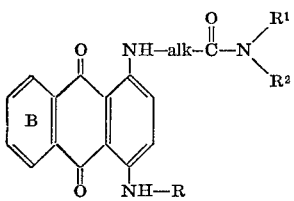

in which $R^1$, $R^2$, R, alk and B have the meanings given above. These 1,4-diaminoanthraquinone derivatives of the formula (II) are hereinafter sometimes referred to as dye bases.

Sulfonation of compounds of the formula (II) may be carried out by conventional methods with concentrated sulfuric acid, 100% by weight sulfuric acid or oleum at low temperature, such as 0° to 5° C., or at ambient temperature up to moderately elevated temperature. The term "moderately elevated temperature" as used herein, means temperatures up to about 70° C.

It is also possible to carry out a sulfochlorination with chlorosulfonic acid and then to hydrolyze the sulfochloride groups into sulfonic acid groups.

The dye bases (II), particularly, those in which alk is a 1,2-ethylene bridge, may be obtained advantageously by adding on an unsaturated compound of the formula (III):

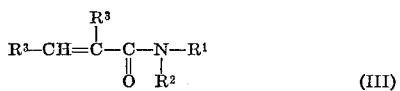

in which one $R^3$ is methyl and the other $R^3$ or preferably both radicals $R^3$ are hydrogen and $R^1$ and $R^2$ have the above meanings to a diaminoanthraquinone of the formula (IV):

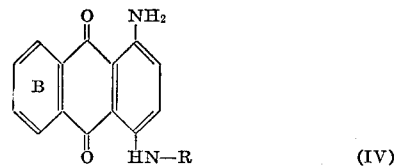

in which R and B have the meanings given above.

The reaction is advantageously carried out in an inert organic solvent or diluent such as benzene, toluene, chlorobenzene, dichlorobenzene or nitrobenzene in the presence of a more or less large amount of catalyst, preferably acid reacting catalyst, such as benzenesulfonic acid, o-toluenesulfonic acid or p-toluenesulfonic acid, by heating at a temperature of from 50° to 200° C., preferably from 100° to 180° C.

The reaction of compound (IV) with compound (III) may also be carried out by heating the components in an excess of (III), the latter thus serving at the same time as a diluent.

The reaction of the unsaturated compound of the formula (III) with the diamine of the formula (IV) may also be carried out in moderately concentrated mineral acid such as 50% to 75% by weight sulfuric acid at from room temperature to 100° C., preferably at from 30° to 70° C.

Examples of unsaturated compounds of the formula (III) are methacrylic β-phenylethylamide, preferably acrylic β-phenylethylamide, acrylic β-phenyl-β-methylethylamide, acrylic anilide, acrylic 1-naphthylamide, acrylic p-toluidide, acrylic N-methylanilide, acrylic mesidide, acrylic phenetidide, acrylic anisidide, acrylic 3-nitroanilide, acrylic 3,5-dichloroanilide, acrylic (β-phenoxyethyl)-amide or acrylic 4-chloroanilide.

Compounds of the formula (III) are advantageously obtained from the unsaturated carboxylic acid chlorides in an inert solvent such as benzene or toluene at low temperature, for example at 0° to 10° C., by reaction with the corresponding amine of the formula:

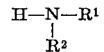

or by reaction in water in accordance with the Schotten-Baumann reaction.

The dye bases (II) may also be obtained by reaction of a diaminoanthraquinone of the formula (V):

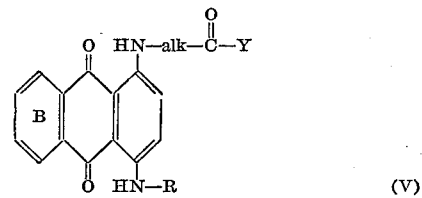

in which Y is a group which is capable of being replaced by an amino radical, for example halogen, such as chlorine, or preferably a —$OR^4$— group in which $R^4$ is advantageously lower alkyl such as ethyl, propyl, methyl or butyl, and alk, B and R have the meanings given above, with an amine of the formula (X).

Compounds of the formula (V) in which Y is a halogen, for example chlorine, may be prepared by a conventional method by reaction of the corresponding carboxylic acid (Y=OH) in an inert organic solvent with a halogenating agent such as thionyl chloride or phosphorus trichloride. The reaction with the amine of the formula (X) may be carried out in a conventional manner in an inert organic solvent or in an excess of the amine. The carboxylic acid ((V) Y=OH) may also be reacted in an excess of the amine of the formula (X) in the presence of a halogenating agent such as phosphorus trichloride in one step to the dye base of formula (II).

The simple amines such as aniline, toluidine, anisidine, chloroaniline and mesidine are particularly suitable for this method.

When the starting material is a carboxylic ester of the formula (V) with Y=—OR⁴, the reaction of compound (II) with the amine of the formula (X) is advantageously carried out in an excess of the amine. This reaction is conveniently carried out in the presence of a small amount of an ammonium salt, preferably a salt of the same amine with a mineral acid such as hydrochloric acid. The reaction generally takes place at a temperature of from 80° C. to the boiling point of the amine, for example up to 200° C. In the case of an amine having a low boiling point it is advantageous to use superatmospheric pressure.

The dye base of the formula (II) may be obtained from a compound of the formula (VI):

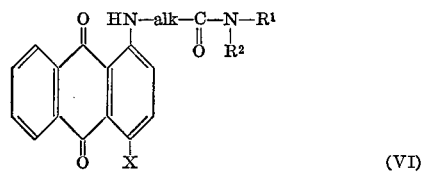

(VI)

in which X is a group which can be replaced by

such as chlorine or bromine and alk, $R^1$, $R^2$ and B have the meanings given above, by reaction with an amine of the formula (VIII)

$$H_2N—R \qquad (VIII)$$

Examples of amines of the formula (VIII) are mononuclear or binuclear aromatic amines in which one to four hydrogens may be replaced by alkyl, alkoxy, alkylthio of one to four carbon atoms, nitro and/or halogen. Specific examples are: aniline, chloroaniline, toluidine, anisidine, phenetidine, aminodiphenyl, aminodiphenyl ether, naphthylamine or aminodiphenylmethane.

The reaction of a compound (VI) with an amine of the formula (VIII) is advantageously carried out in an excess of the amine in the presence of a catalyst such as copper powder, a copper oxide or a copper salt, and preferably in the presence of an agent having an alkaline reaction such as an alkali metal carbonate, alkali metal bicarbonate or tertiary amine.

For technical reasons particular interest attaches to dyes of the formula (Ia):

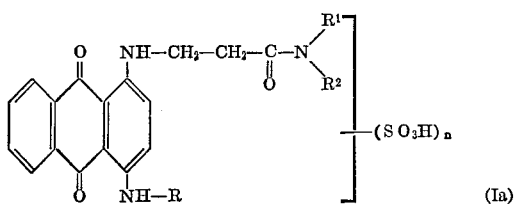

(Ia)

in which $R^1$, $R^2$, R and $n$ have the meanings given above. Those dyes are particularly preferred in which R is an unsubstituted or substituted phenylene or diphenyl ether radical.

The dyes of the formula (I) in which only R bears one or more than one sulfonic acid group and in which $R^1$ may be an easily sulfonatable radical can be prepared from a diaminoanthraquinone derivative of the formula (IV).

The diaminoanthraquinone derivative (IV) is sulfonated by a conventional method and an unsaturated compound of the formula (III) is added on to the resultant sulfonic acid or a soluble salt thereof. The reaction conditions are practically the same as have been described for the reaction of (III) with (IV).

The same dyes may also be obtained from diaminoanthraquinones of the formula (V) in which R bears one or more sulfonic acid group by reaction with the amines. It is preferred to start from a diaminoanthraquinone (V) in which X is a lower alkoxy. The reaction conditions are partically the same as in the reaction of a diaminoanthraquinonecarboxylic acid ester of the formula (V) (—OR⁴ being lower alkyl) with an amine (VII).

The new dyes of the formula (I) are valuable blue acid dyes which dye nitrogenous fibers, particularly polyamide fibers, clear blue shades having very good light fastness, good wet fastness and at the same time good tinctorial behavior, e.g. good levelling power.

The new dyes may be used in the form of the sulfonic acids or in the form of water-soluble salts such as the sodium, potassium or ammonium salts.

The dyes may be used individually, mixed with one another or mixed with other dyes.

The invention is illustrated by the following Examples. Parts and percentages are by weight.

EXAMPLE 1

40 parts of 1-β-carboxyethylamino-4-(4'-toluidino)-anthraquinone (prepared by boiling 30 parts of 1-amino-4-(4'-toluidino)-anthraquinone in 150 parts of 75% aqueous acrylic acid) is dissolved in 200 parts of aniline. 14 parts of phosphorus trichloride is allowed to drip in at 40° C., the whole is heated to 60° to 65° C. and kept at this temperature until starting material can no longer be detected chromatographically. This is the case after about five hours. The excess aniline is then distilled off with steam and the product is filtered, washed and dried. A very good yield of a compound is obtained which has the formula:

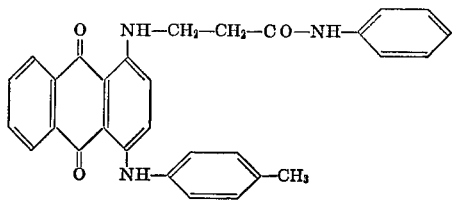

EXAMPLE 2

15 parts of the compound obtained according to Example 1 is introduced at 5° to 10° C. into 75 parts of oleum ($SO_3$-content: 10%) and stirred at the said temperature until a sample which has been removed and worked up is completely soluble in hot water. This is the case after about two hours. Precipitation is effected on sodium chloride solution to which ice has been added, the precipitate is filtered, the filtered material is stirred with water and made neutral with aqueous potassium hydroxide solution, and the dye is salted out with potassium chloride, filtered and dried.

A very good yield of a dye of the formula:

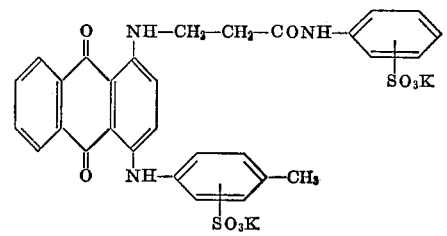

is obtained which dyes polyamide clear blue shades of very good light fastness and good fastness to perspiration.

EXAMPLE 3

The procedure described in Example 2 is followed but oleum having an $SO_3$ content of 5% is used instead of the oleum having an SO₃ content of 10%. A very good yield of a similar dye of the formula:

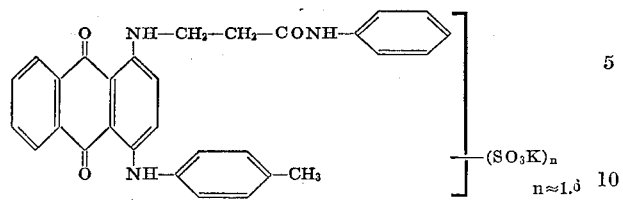

is obtained (n being equal to about 1.6).

EXAMPLE 4

32.8 parts of 1-amino-4-(4'-anisidino)-anthraquinone, 75 parts of anhydrous o-dichlorobenzene and 20 parts of p-toluenesulfonic acid are heated at 100° and 110° C. and 30 parts of acrylic β-phenylethylamide (obtainable from acrylyl chloride and β-phenylethylamine in benzene in the cold) is added within twenty minutes. The whole is kept at this temperature for two hours, another 15 parts of acrylic β-phenylethylamide is added and the whole is kept at 100° to 110° C. for about two hours until practically no starting material can be detected chromatographically. The whole is diluted with ethyl alcohol and filtered while cold, and the filter cake is washed with ethyl alcohol and with water and dried. A very good yield of a compound of the formula:

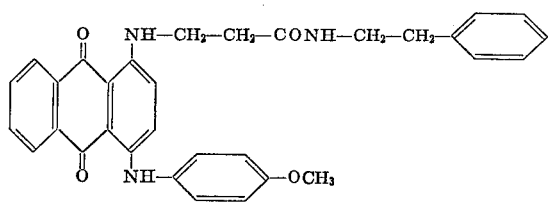

is obtained.

EXAMPLE 5

15 parts of the compound obtained according to Example 4 is introduced at 5° to 10° C. into 75 parts of oleum (SO₃ content: 10%) and stirred at this temperature until a sample withdrawn and worked up is completely soluble in hot water. This is the case after about two hours. Precipitation is effected on a mixture of equal parts of ice and concentrated potassium chloride solution, the aqueous phase is separated, the residue is stirred with saturated potassium chloride solution, made neutral with dilute potassium hydroxide solution, stirred for a long time, filtered and dried. A very good yield of a dye of the formula:

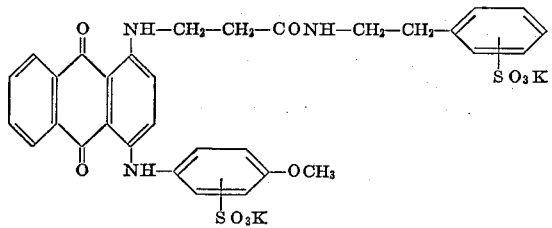

is obtained which dyes polyamide clear blue shades of very good light fastness and good wet fastness properties.

EXAMPLE 6

16.1 parts of 1-β-carboethoxyethylamino-4-(4'-toluidino)-anthraquinone is heated to 145° to 150° C. in 80 parts of β-phenylethylamine and kept at this temperature for five hours. The whole is then diluted with ethyl alcohol and filtered, and the filter residue is washed with ethyl alcohol and water and dried. 15 parts of this compound is introduced at 5° to 10° C. into 75 parts of oleum (SO₃ content: 10%) and the whole is stirred for about two hours at this temperature until a sample is completely soluble in hot water. The whole is poured onto a mixture of equal parts of ice and saturated potassium chloride solution, the aqueous phase is separated, the residue is stirred with saturated potassium chloride solution, made neutral with dilute potassium hydroxide solution, filtered and dried. A dye having the formula:

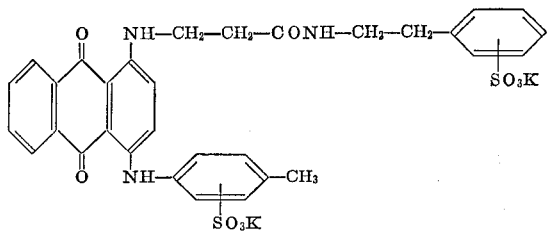

is obtained which dyes polyamide blue shades of good fastness properties.

1-β-carboethoxyethylamino - 4 - (4'-toluidino)-anthraquinone is obtained by boiling a mixture of 75 parts of anhydrous o-dichlorobenzene, 32.8 parts of 1-amino-4-(4'-toluidino)-anthraquinone, 20 parts of p-toluenesulfonic acid and 20 parts of ethyl acrylate for ten hours.

EXAMPLE 7

32.8 parts of 1-amino-4-(4'-anisidino)-anthraquinone, 75 parts of anhydrous o-dichlorobenzene and 20 parts of p-toluenesulfonic acid are heated to 100° to 110° C. and 30 parts of acrylic p-toluidide (obtainable from acrylyl chloride and p-toluidine in benzene in the cold) is added within twenty minutes. The whole is kept at 100° to 110° C. for about two hours until starting material is practically no longer detectable chromatographically. The whole is diluted with ethyl alcohol and filtered while cold, and the filter residue is washed with ethyl alcohol and with water and dried.

A compound of the formula:

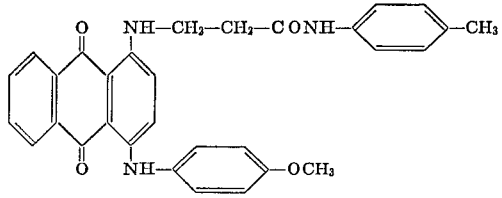

is obtained.

EXAMPLE 8

15 parts of the compound obtained according to Example 7 is sulfonated in the manner described in Example 5. A dye of the formula:

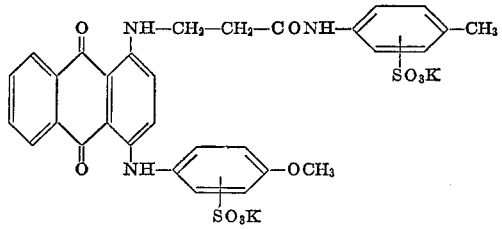

is obtained which dyes polyamide blue shades of very good light fastness and good wet fastness.

EXAMPLE 9

16.4 parts of 1-amino-4-(4'-toluidino)-anthraquinone, 40 parts of anhydrous o-dichlorobenzene and 10 parts of p-toluenesulfonic acid is heated to 100° to 110° C. and 15 parts of acrylanilide (prepared from acrylyl chloride and aniline in benzene in the cold) is added within twenty minutes. After six hours at 100° to 110° C., another 5 parts of acrylanilide is added and the whole is stirred for another five hours at 100° to 110° C. Starting compound is then no longer detectable chromatographically. The whole is diluted with methanol, filtered and the residue washed with methanol and water. A compound of the formula:

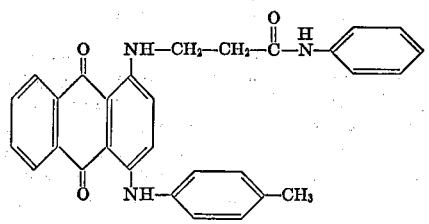

is obtained in a good yield.

EXAMPLE 10

The dye base obtained according to Example 9 is sulfonated as described in Example 2 and the sulphonic acid is isolated. A dye is obtained which is identical with that obtained in Example 2.

EXAMPLES 11 TO 18

In accordance with the method described in Examples 4, 7 or 9, the 1,4-diaminoanthraquinone derivatives given at A in the following Examples are reacted with acrylamides given at B. Dye bases C are obtained.

EXAMPLE 11

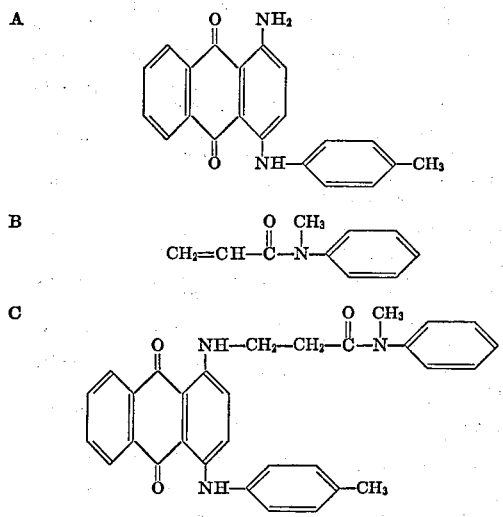

EXAMPLE 12

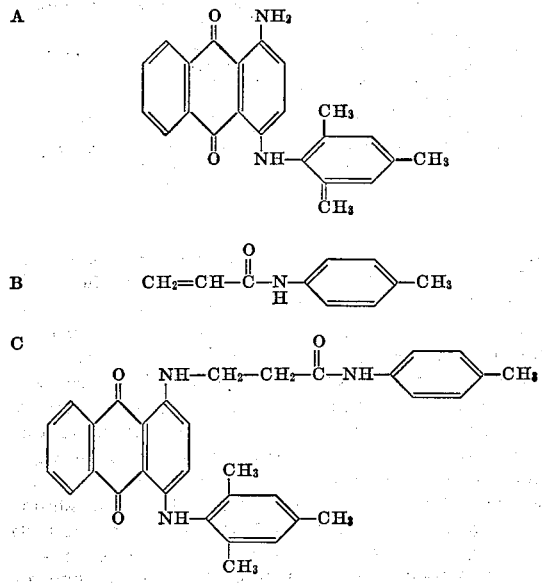

EXAMPLE 13

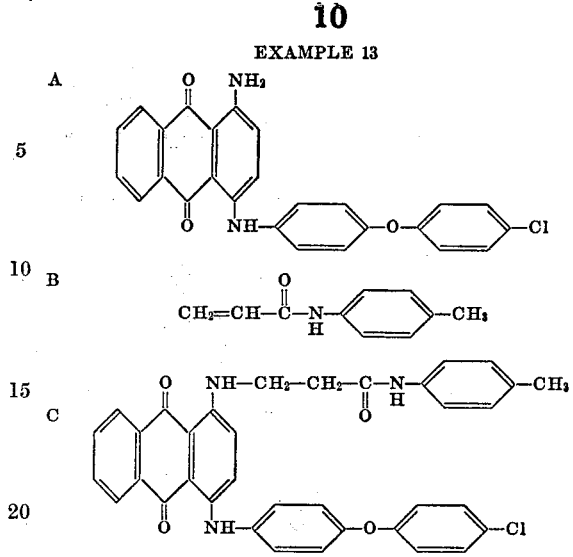

EXAMPLE 14

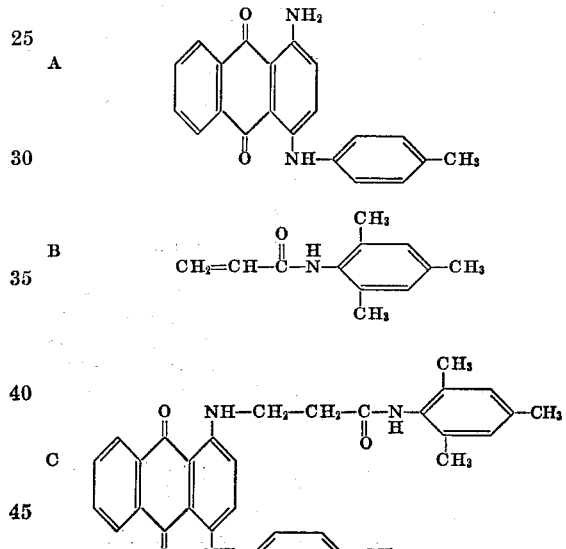

EXAMPLE 15

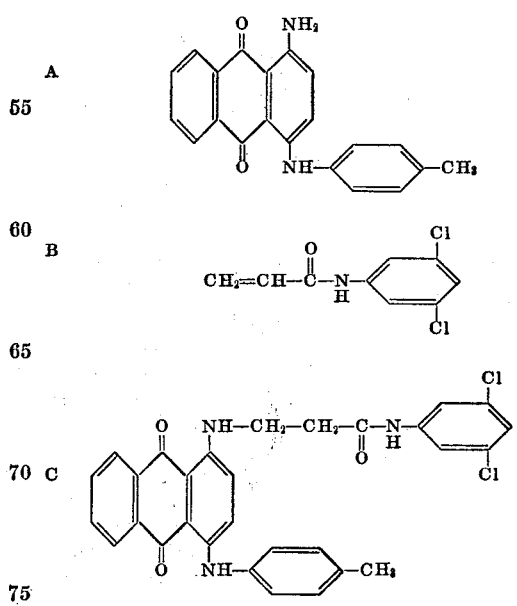

EXAMPLE 16
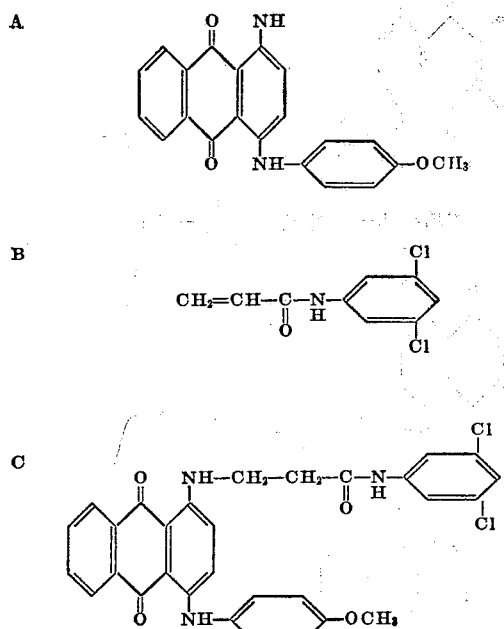
EXAMPLE 17
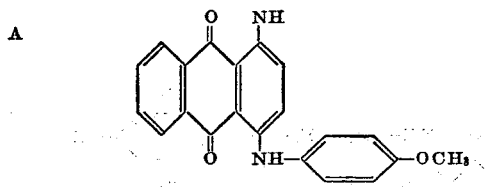
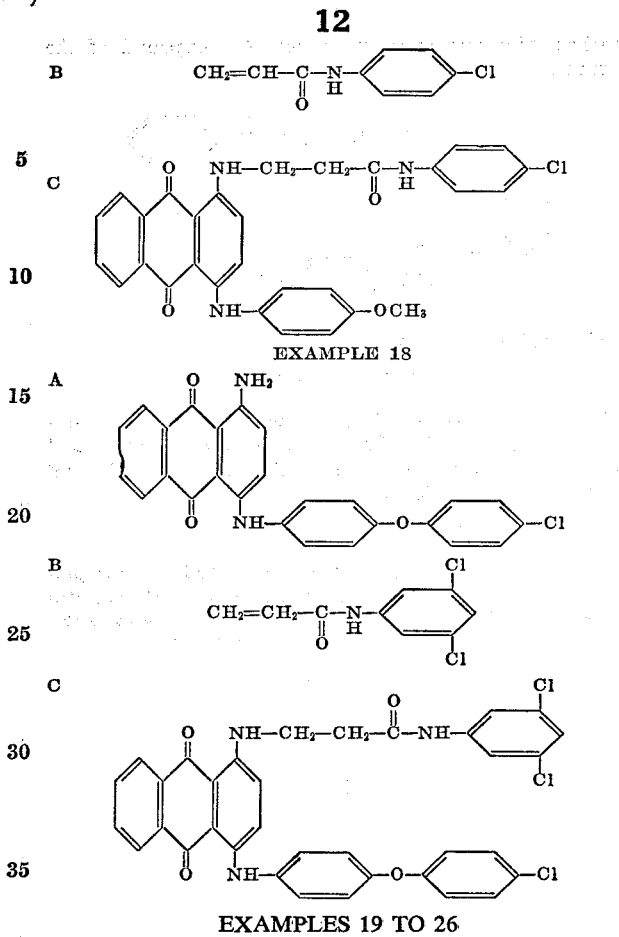
EXAMPLES 19 TO 26
The dye bases obtained according to Examples 11 to 18 are sulfonated as described in Example 2 or 5. After working up, the dyes specified under D are obtained in in a good yield:
| Example | From Example C | Dye D |
|---|---|---|
| 19 | 11 | (structure shown) |
| 20 | 12 | (structure shown) |
| 21 | 13 | (structure shown) |

TABLE—Continued

| Example | From Example C | Dye D |
|---|---|---|
| 22 | 14 | Mixture of $n'=2$ and $n'=3$ |
| 23 | 15 | |
| 24 | 16 | |
| 25 | 17 | |
| 26 | 18 | Mixture of $n'=1$, $n'=2$ and $n'=3$ |

EXAMPLE 27

32.8 parts of 1-amino-4-(4'-toluidino)-anthraquinone, 75 parts of anhydrous o-dichlorobenzene and 20 parts of p-toluenesulfonic acid are heated to 100° to 110° C. and then 30 parts of acrylic m-nitroanilide (prepared from acrylyl chloride and m-nitraniline in benzene in the cold) is added in the course of 20 minutes. Stirring is continued at 100° to 110° C. until aminoanthraquinone compound is practically no longer detectable, the o-dichlorobenzene is distilled off with steam, the aqueous residue is filtered while cold, and the filter cake is washed until neutral and dried. The dry product is purified by stirring in hot methanol. The compound of the formula

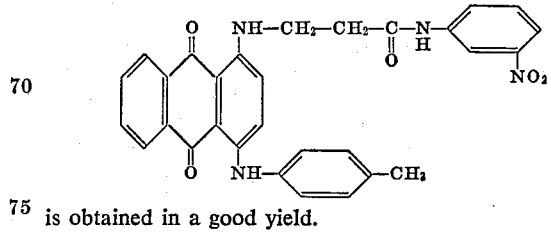

is obtained in a good yield.

EXAMPLE 28

15 parts of the compound obtained according to Example 27 is introduced at 5° to 10° C. into 75 parts of oleum (SO₃ content: 10%) and stirred at this temperature until a processed sample dissolves completely in hot 1 to 2% aqueous ammonia solution. This is the case after about two hours. The reaction mixture is then poured onto a mixture of equal parts of ice and water and the precipitate formed is filtered off, stirred into 500 parts of cold water, neutralized with dilute sodium hydroxide solution and salted out by adding 20 parts of 10% sodium chloride solution. The precipitate is filtered off and dried. There is obtained 22.4 parts of a salt-containing dye which contains about 75% of the dye of the formula

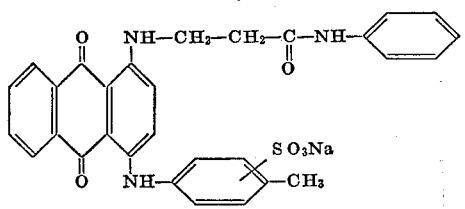

The dye obtained dyes polyamide clear blue shades of very good fastness to wet treatment and good light fastness.

EXAMPLE 29

To 16.4 parts of the compound

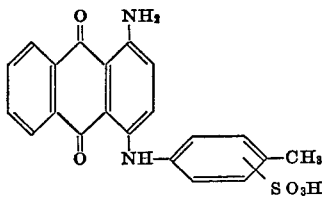

obtained by sulfonation of 1-amino-4-p-toluidinoanthraquinone is introduced into 40 parts of anhydrous o-dichlorobenzene and then 20 parts of acrylanilide is added at 100° to 110° C. in the presence of 10 parts of p-toluenesulfonic acid in the course of 30 minutes. Stirring is continued for two hours at 100° to 110° C., another 10 parts of acrylanilide is added, and after about two hours the reaction mixture is worked up, provided that anthraquinone compound can no longer be detected. The o-dichlorobenzene is distilled off with steam and the precipitate is filtered off and washed with methanol. The filter residue is converted into the potassium salt in the way described in Example 28. The dye of the formula

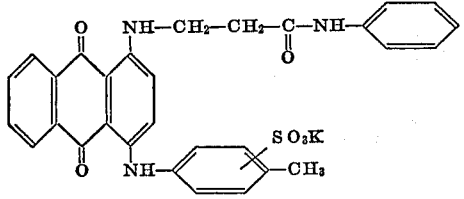

is obtained in a good yield. It dyes polyamide clear blue shades having good fastness properties.

EXAMPLE 30

17 parts of the compound of the formula

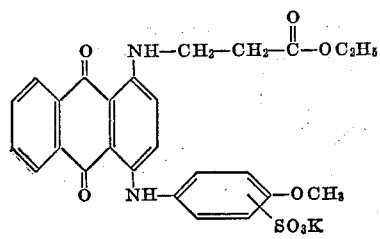

(obtained from 1-(β-carbethoxyethyl)-amino-4-p-anisidinoanthraquinone by sulfonation with 8% oleum at room temperature) and 80 parts of β-phenylethylamine are stirred together at 145° to 150° C. until anthraquinone compound can no longer be detected. This is the case after about seven hours. The reaction mixture is diluted with ethanol, and the precipitate is filtered off at room temperature, washed with ethanol and ground with concentrated potassium chloride solution. The aqueous phase is separated and the residue dried. The dye of the formula

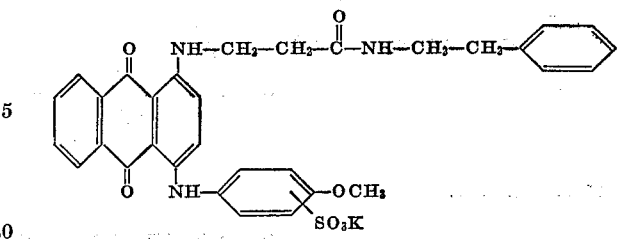

is obtained in a good yield. It dyes polyamide blue shades having good fastness properties.

I claim:
1. A blue anthraquinoid acid dye obtained by sulfonating a compound of the formula

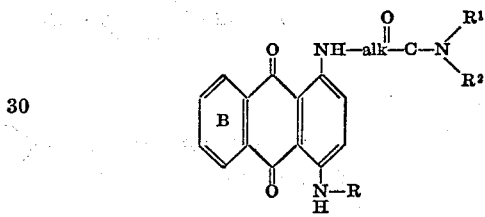

in which
alk is a linear or branched alkylene of one to thre carbon atoms;
$R^1$ is selected from the group consisting of phenyl which may bear from one to four identical or different substituents selected from the group consisting of alkyl, alkoxy or akylthio of one to four carbon atoms and halogen or which may bear one nitro substituent; naphthyl;

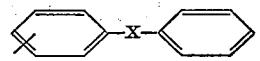

wherein X is a direct linkage, —O—, —S—,

—CH₂—, —CH₂—CH₂—, —CH(CH₃)— or —C(CH₃)₂—;
phenylalkyl of seven to ten carbon atoms;

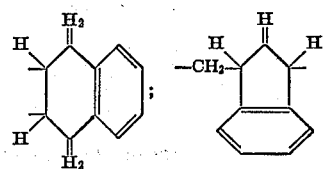

and alkyl of one to five carbon atoms which bears a phenyloxy or phenylthio as a substituent wherein said phenyloxy or phenylthio may be substituted by alkyl or alkoxy of one to four carbon atoms or halogen;
$R^2$ is hydrogen or lower alkyl;
R is selected from the group consisting of phenyl, naphthyl and

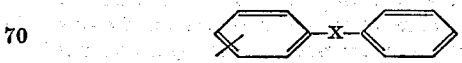

wherein X is a direct bond, —O—, —S—, —CH₂—, —CH₂—CH₂—,

—SO₂,

—C(CH$_3$)$_2$— and wherein said R radical may bear from one to four identical or different substituents selected from the group consisting of alkyl, alkoxy, alkylthio of one to four carbon atoms or halogen and in which one hydrogen or two hydrogens in the ring B may be replaced by hydroxy or chlorine.

2. A dye of the formula given in claim 1 in which alk is a —CH$_2$—CH$_2$ group, R$^1$ is phenyl which may bear from one to three identical or different substituents selected from the group consisting of methyl, methoxy, ethoxy, methylthio, chlorine, bromine and fluorine or one nitro group, or phenylalkyl of seven to ten carbon atoms, R$^2$ is hydrogen, methyl or ethyl, R is phenyl which may bear from one to three identical or different substituents selected from the group consisting of methyl, methoxy, ethoxy, methylthio, chlorine, bromine and fluorine, or a diphenyl ether radical which may bear chlorine or bromine as a substituent.

3. A dye of the formula given in claim 1 in which alk is —CH$_2$—CH$_2$—, R$^1$ is phenyl, tolyl, dimethylphenyl, trimethylphenyl, chlorophenyl, bromophenyl, dichlorophenyl, nitrophenyl, β-phenylethyl, benzyl, methoxyphenyl or ethoxyphenyl, R$^2$ is hydrogen or methyl, R is phenyl, tolyl, dimethylphenyl, trimethylphenyl, methoxyphenyl, ethoxyphenyl, chlorophenyl, diphenyl, a diphenyl ether radical or a chlorodiphenyl ether radical and in which the ring B is not substituted.

4. A dye of the formula given in claim 1 in which alk is —CH$_2$—CH$_2$—, R$^1$ is phenyl, 4-tolyl, 2,4,6-trimethylphenyl, 4-chlorophenyl, 2,5-dichlorophenyl, 3-nitrophenyl, 4-methoxyphenyl, 4-ethoxyphenyl or β-phenylethyl, R$^2$ is hydrogen, R is phenyl, 4-tolyl, 2,4,6-trimethylphenyl, 4-methoxyphenyl, 4-ethoxyphenyl or 4-(4'-chlorophenoxy)-phenyl and in which the ring B is not substituted.

References Cited
UNITED STATES PATENTS 3,580,933    5/1971    Guenthard ---------- 260—372

LORRAINE A. WEINBERGER, Primary Examiner

E. J. SKELLY, Assistant Examiner

U.S. Cl. X.R.

8—39; 260—377

UNITED STATES PATENT OFFICE
CERTIFICATE OF CORRECTION

PATENT NO. : 3,842,101
DATED : October 15, 1974
INVENTOR(S) : Fritz Graser

It is certified that error appears in the above-identified patent and that said Letters Patent are hereby corrected as shown below:

In Column 1, the first formula in Claim 1, delete

" "  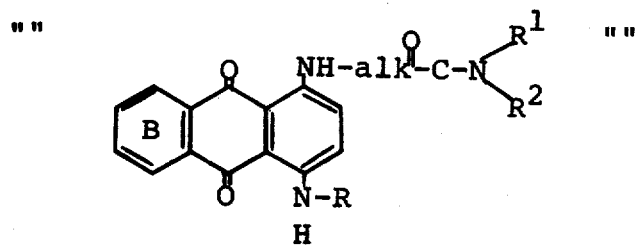  " "

and substitute

--  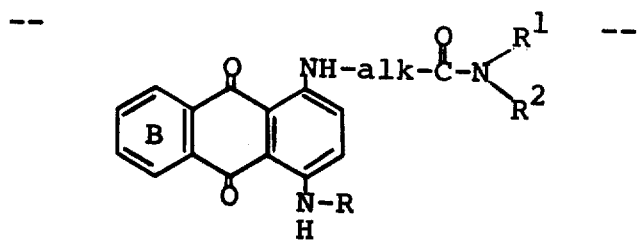  --

In Column 16, Line 37, delete "thre" and substitute --three--

Signed and Sealed this

Twenty-fourth Day of August 1976

[SEAL]

Attest:

RUTH C. MASON
*Attesting Officer*

C. MARSHALL DANN
*Commissioner of Patents and Trademarks*